Sept. 20, 1960     J. LEMPERT     2,953,703
PHOTOMULTIPLIER DESIGN HAVING HIGH RESPONSE TO X-RAYS Filed June 14, 1954

INVENTOR
Joseph Lempert
BY
F. E. Browder
ATTORNEY

United States Patent Office 2,953,703
Patented Sept. 20, 1960

2,953,703

PHOTOMULTIPLIER DESIGN HAVING HIGH RESPONSE TO X-RAYS

Joseph Lempert, West Elmira, N.Y., assignor to Westinghouse Electric Corporation, East Pittsburgh, Pa., a corporation of Pennsylvania Filed June 14, 1954, Ser. No. 436,606

12 Claims. (Cl. 313—94)

My invention relates to radiation detecting and measuring devices and in particular relates to improved forms of tubes for producing electric currents in response to X-rays, gamma rays and other radiation.

Among the most satisfactory arrangements heretofore used for the detection and measurement of radiation of wave lengths far below the visible has been the use of a fluorescent substance changing the radiation to visible wave lengths and a detection or measurement of the latter by means of a photoelectric cell and suitable electrical circuits energized thereby. However, in the case of X-ray and gamma radiations, cases are met with where the sensitivity of the arrangement just described proves quite inadequate because of the low absorbing power of the fluorescent substance. It is necessary to use the fluorescent substance in layers thin enough so that the light generated in it is able to reach the photoelectric cell, and some of the substances most responsive to X-rays and gamma rays, for example zinc sulphide, have low translucence so that, if the attempt is made to raise their X-ray absorption by increasing their thickness, a thickness is soon reached at which the internal absorption cuts down the light output to the photoelectric cell so heavily that sensitivity of the measuring device actually is decreased. For measuring X-ray and gamma radiations, the efficiency of the above-described arrangement is far from satisfactory.

One object of my invention is to provide a new and improved arrangement for detecting or measuring radiations having wave lengths in the X-ray and gamma ray order.

Another object is to provide an X-ray and gamma ray detector of greater efficiency and sensitivity than those of the prior art.

Another object is to provide a radiation detector which combines the principles of electron multipliers with those of radiation detector in a single compact structure of high conversion efficiency.

Another object is to provide a radiation detector structure in which the effects of space charge in impeding current flow are much reduced over that met in the prior art.

Other objects of my invention will become evident to those skilled in the art after reading the following description taken in connection with the drawings, in which.

Figure 1:
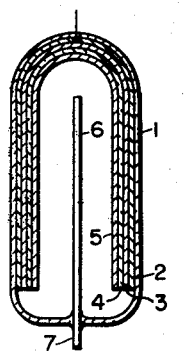
Figure 1 is a schematic view in longitudinal section of a radiation detector and measurement tube embodying the principles of my invention.

Referring in detail to Fig. 1, a detector tube for X-rays, gamma rays or other radiation has a vacuum-tight enclosure 1, which may be of beryllium, glass or other material transparent to X-rays on the interior wall of which is a layer 2 of light reflecting metal, such as aluminum. On this aluminum layer 2 is a layer 3 of zinc sulphide or other suitable material which emits light under impact of the radiation being measured. A layer 4 of some transparent conducting material such as NESA, sold by the Pittsburgh Plate Glass Co., Pittsburgh, Pa., covers the free face of the phosphor layer 3, and is covered in turn by a layer 5 of cesiated antimony, bismuth-silver-cesium-oxygen, or other suitable photoelectrically emissive material. The layers 2, 3, 4 and 5 are shown diagrammatically to enlarged scale where the reference numerals are applied in Fig. 1. The anode of the detector tube is a central rod 6 supported on an in-lead 7 passing through the press of the tube. The cathode in-lead is sealed through the tube wall at its top and contacts the conducting layer 4.

X-ray or similar radiation incident upon the outer wall of the tube passes through the layer 2 and generates light, proportional to its intensity, in the phosphor layer 3. This light passes through the transparent conductive layer 4 and causes the electron-emissive layer 5 to emit electrons which are collected by the anode 6 and produce indicator or meter currents in any desired external circuit of well-known type. The large area of the layer 3, occupying almost the entire peripheral surface of the tube, insures maximum photoelectron flow to anode 6 and thus gives a detector of relatively high sensitivity. The metal layer reflects any light that otherwise would leave the tube and insures that it causes electron emission from layer 5.

For certain types of service, it may be desirable to deposit the phosphor layer 3 and reflecting layer 2 on the outside of the wall of the tube instead of inside of it, in which case the phosphor layer 3 would be deposited on the tube wall and the reflecting layer 2 outside of it.

Figure 2:
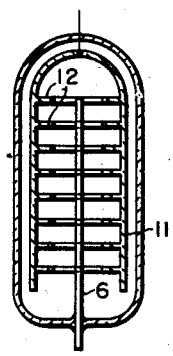
Figs. 2, 3 and 4 are similar views of improved structures for detectors of the type shown in Fig. 1.

Fig. 2 shows a detector tube of the same general type as Fig. 1, but in which layers like 1 to 5 of the latter are deposited on the interior of a glass backing-cylinder 11 having fins 12 projecting inward from its internal surface. These layers cover the surfaces of the fins also and materially increase the area of both the phosphor layer 3 and the photo-emitting layer 5, thereby increasing the X-ray interception and electron flow for a detector tube of given dimensions. In some instances, it may be desirable to make the metal layer 2 thick enough to be self-supporting, in which layer the glass backing-cylinder 11 may be dispensed with.

Figure 3:
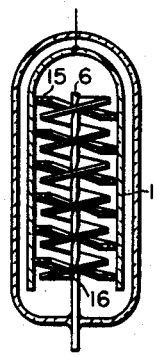

Fig. 3 shows a modification of the Fig. 2 structure, in which the internal surface of the backing-cylinder has a single helicoidal ledge 15 projecting inward and the anode has a helicoidal ledge 16 of the same pitch projecting into the helicoidal space between the turns of ledge 15. The inner surface of cylinder 11 and the surface of ledge 15 are covered with layers like 2, 3, 4 and 5 in Fig. 1. The close spacing of the anode helicoid 16 and cathode helicoid 15 and the increase surface area of the anode reduce the impedance to electron flow imposed by space-charge effects in Figs. 1 and 2.

Figure 4:
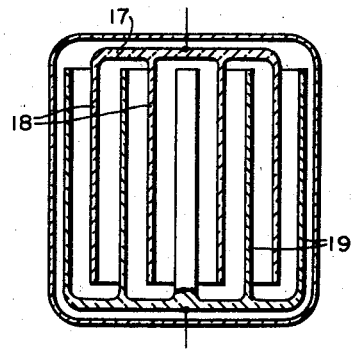

Fig. 4 shows still another structure in which the close spacing of anode and cathode, and the wide area available at all points for electron flow between them, minimizes impedance due to space charge. Thus, the cathode comprises a plurality of concentric cylindrical surfaces 18 of glass, thin metal or metal-coated glass, coated on both sides with layers 3, 4 and 5 like the similarly numbered layers in Fig. 1. The anode is a plurality of cylinders 19 of metal extending between the cathode cylinders.

Figure 5:
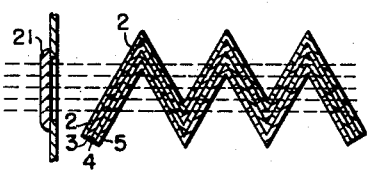
Figs. 5, 6 and 7 are schematic views of improved forms of cathode for use in X-ray and gamma ray detectors.

Fig. 5 shows a structure for cathodes of detectors of X-ray, gamma radiations, and the like, in which the radiation passes a multiplicity of times through the absorbing phosphor whereby the photons which miss absorption in the first area traversed may be absorbed on the second, third or other areas they strike. A large area of photo-emissive material is attained also.

Thus, the cathode may comprise a thin metal sheet 2 highly polished on at least one side and folded into the zig-zag form shown. The polished side is coated with a layer 3 of zinc sulphide, and a layer 4 of conductive transparent material is sandwiched between the layer 3 and a layer 5 of photoelectrically-emissive material, such as cesiated antimony or bismuth-silver-cesium-oxygen. The X-rays or other radiation to be detected is projected through a suitable window 21 in the tube wall in a direction such that it passes through the multiple folds of the cathode. The radiation quanta which miss absorption in the first fold pass into the second fold; those not absorbed there pass into the third fold; and so on. Nevertheless, the phosphor thickness on each fold is low enough so that no great part of the light generated therein is absorbed by the phosphor and most of it reaches the photo-emissive layer 5. The polished metal 2 reflects any light that might otherwise escape the photo-emissive layer 5 and insures that it stimulates the latter.

As an alternative to making the layer 2 of metal, it may be of glass coated with a thin reflecting metallic coating. Still another alternative is represented in Fig. 6, where the backing-layer 22 is of tranlucent material, and a reflector 23 sends back any light leaving the phosphor layer in a direction away from the photo-emissive layer 5.

Figure 7:
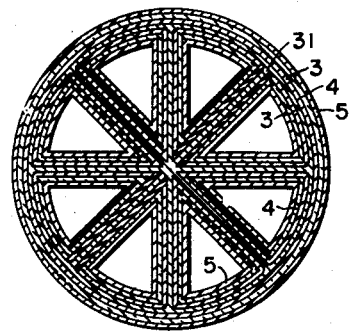

Fig. 7 illustrates still another improved form of cathode for radiation detector tubes. A cylindrical wall 31, which may be of thin metal or glass coated with a suitable reflecting coating, is provided with radial walls. Both sides of the cylindrical wall and each radial wall are coated with a layer 3 of zinc sulphide; the latter is coated everywhere with a conductive transparent coating 4; and the latter, in turn, with a photoelectrically-emissive coating 5.

Figure 8:
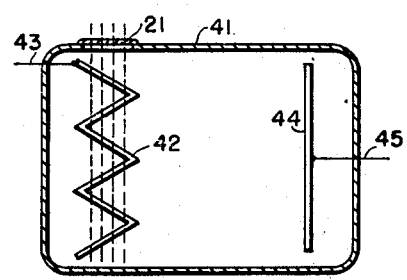
Fig. 8 is a diagrammatic representation of one type of radition detector tube employing the cathode of Fig. 5.

Fig. 8 illustrates a radiation detector tube embodying the cathode of Fig. 5. The tube comprises a vacuum-tight container 41 having a window 21 transparent to the radiation which is to be detected, and a cathode 42 of the type shown by Fig. 5, in the path of incoming radiation. An inlead 43 gives contact to the cathode layer 2 for one of the numerous known detector circuits, and an anode 44 with inlead 45 completes the circuit.

Figure 6:
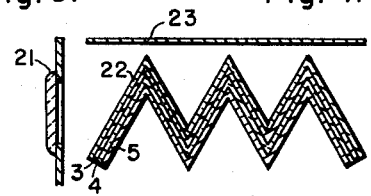

The cathodes of Fig. 6 or Fig. 7 may be substituted in tube 41 for cathode 42 in ways too evident to need detailed description. The cathode of Fig. 7 would preferably have its cylindrical axis coincident with the central axis of tube 41 and anode 44.

Figure 9:
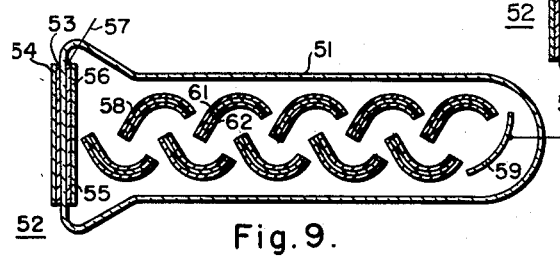

In Fig. 9, I show a tube in which the principles of my improved type of cathode are applied to the structure of a photomultiplier to obtain a detector of greatly enhanced sensitivity. Thus, a vacuum-tight container 51 is provided at one end with a radiation-stimulated cathode 52 comprising a layer 53 of material such as zinc sulphide which fluoresces to generate visible light when irradiated by X-rays or other radiation which it is desired to detect or measure. While shown in Fig. 8 as on the outside of the tube wall, the layer 53 may of course be positioned inside the tube wall; and in either event should have its outward face coated with a light-reflecting surface 54. The inner face of the wall should be surfaced with a thin layer 55 of transparent conductive material, and the latter with a layer 56 of photo-emissive material. An inlead 57 makes contact to the conductive material 55.

Properly spaced from the cathode 52 is a series of dynodes 58, of well-known type for electron multipliers, terminating in an anode 59. Each dynode 58 has its inside surface polished to high reflectivity and surfaced with a layer 61 of fluorescent material, such as zinc sulphide, which is excited by the radiation being detected; and the surface of the layer 61 is coated with a photo-emissive material 62, such as cesiated antimony, or bismuth-silver-cesium-oxygen, which emits secondary electrons freely when struck by primary electrons. If necessary, a thin layer of potassium silicate may be sandwiched between the layers 61 and 62 to prevent chemical action at their contiguous surfaces. The radiation to be measured is projected upon the screen 52, and any photons that miss absorption therein strike the fluorescent layer 61 on the first or second dynode, stimulating light-emission in the latter and causing the adjacent photo-electric layer 62 to add emitted electrons to the secondary electrons generated at its surface by the electrons streaming from the photo-emissive layer 56 of screen 52. The radiation photons which miss absorption in the fluorescent layers 61 of the first and second dynodes strike the fluorescent layers of the third and fourth dynodes where they generate light which stimulates the adjacent photo-emissive layers thereon to add electrons to the secondary electrons produced by the impact of the electron stream sent to them from the preceding dynodes. The electron stream is thus augmented as it passes from dynode to dynode by the electrons generated locally by the incident X-rays or other detected radiation; and by the time the collector anode 59 is reached the electron current has been amplified many fold. My arrangement thus attains a great increase of sensitivity over prior art devices in which the radiation absorbing screen merely fed electrons to a set of electron-multiplier dynodes.

It will, in some cases, be desirable to impress sufficient voltages between different stages of the electron multiplier in Fig. 9 so that some electrons pass completely through the secondary emitting layers 62 into the underlying fluorescent layers 61 and excite additional light emission in the latter.

Figure 10:
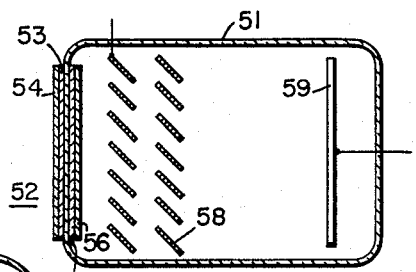
Figs. 9 and 10 are schematic views in longitudinal section of tubes combining the functions of radiation detection and electron multiplication in a single structure.

As is seen in Fig. 10, the dynode coatings of Fig. 9 may be applied to electromultiplier electrodes of the unfocussed type known as "Venetian blind." Both in Fig. 9 and Fig. 10, successive dynodes may be so positioned that radiation passing between vanes of one set will be aligned to strike succeeding vanes.

While in the foregoing figures I have described the principles of my invention as applied to the production of electric currents and electron streams in response to the incidence of X-rays on a composite cathode comprising a layer of photoelectrically emissive material overlying a layer of fluorescent material, the geometrical features of the invention are applicable regardless of the wave-length of the incident radiation, and of whether the absorbing-emitting layer is of compound type comprising two or more different substances or is a simple layer of a single substance which both accepts the incident radiation and responds by emitting electrons or other radiation. In any case, however, no layer in the path of the incident radiation passing through successive screen areas should be opaque to the incident radiation. I intend, therefore, that the following claims should not be limited in scope except in accordance with express limitations included in them.

I claim as my invention:

1. A radiation detector comprising an anode and a cathode each comprising a plurality of concentric cylinders, the surfaces of said cathode cylinders having a first coating of a fluorescent substance, a second coating of a transparent conducting substance and a third coating of a photo-electronically emissive substance.

2. A radiation detector comprising a vacuum-tight container enclosing an anode having a helicoidal surface and a cathode having a helicoidal surface interleaved therewith, the surfaces of said cathode being covered with a first layer comprising a fluorescent substance, a second layer comprising a transparent conductive substance, and a third layer comprising a photoelectrically-emissive substance.

3. A radiation detector comprising a vacuum-tight container enclosing an anode, a cathode and an electron multiplier, said cathode and said electron multiplier being coated with a first layer comprising a fluorescent substance, a second layer comprising a transparent conductor substance and a third layer comprising an electronically-emissive substance.

4. A radiation detector comprising a vacuum-tight container enclosing an anode and having a cathode having a manifolded surface comprising a plurality of areas of a material capable of absorbing radiation and emitting electrons in response thereto, said areas being aligned with each other and with a wall portion of said container which is transparent to said radiation.

5. A radiation detector comprising a vacuum-type container enclosing a cathode structure for intercepting and absorbing substantially all radiation directed thereto, said cathode comprising a plurality of radiation intercepting successive surfaces, each of said surfaces capable of absorbing a portion of said radiation while transmitting a substantial portion of the radiation to the successive intercepting layers, each of said surfaces comprising a first layer of fluorescent material responsive to said radiation, a second layer of electron emissive material responsive to the radiation from said fluorescent material and an electron collecting means common to all of said surfaces for collecting the electrons emitted from each of said electron emissive layers.

6. A radiation detector comprising a vacuum-type container enclosing a cathode structure for intercepting and absorbing substantially all radiation directed thereto, said cathode comprising a plurality of radiation intercepting successive surfaces, each of said surfaces capable of absorbing a portion of said radiation while transmitting a substantial portion of the radiation to the successive intercepting layers, each of said surfaces comprising a first layer of fluorescent material responsive to said radiation, said first layer of a thickness such that substantially all of the light generated within said layer is emitted from said layer, a second layer of electron emissive material responsive to the radiation from said fluorescent material and an electron collecting means common to all of said surfaces for collecting the electrons emitted from each of said electron emissive layers.

7. A radiation detector comprising a vacuum-type container enclosing a cathode structure for intercepting and absorbing substantially all the incident radiation directed thereto, said cathode comprising a multifold support surface coated with a first layer of a florescent material sensitive to said incident radiation and capable of generating radiation in response to said incident radiation and of a thickness such that substantially all the radiation generated within said first layer is emitted therefrom, a second layer of a material transmissive to the radiation from said first layer, and a third layer of electron emissive material sensitive to the radiation from said first layer and a common electrode for collecting the electrons emitted from said electron emissive layer.

8. A radiation detector comprising a vacuum-type container enclosing a cathode structure for intercepting and absorbing substantially all the incident radiation directed thereto, said cathode comprising a multifold support surface coated with a first layer of a fluorescent material sensitive to said incident radiation and of a thickness such that substantially all the radiation genearted within said first layer in response to said incident radiation is emitted therefrom, a second layer of a transparent material, and a third layer of electron emissive material sensitive to the radiation from said first layer and a reflector opposite the face of said first layer which faces away from said electron emissive layer for reflecting radiations from said first layer and a common electrode for collecting substantially all of the electrons emitted from said electron emissive layer.

9. A radiation detector comprising a vacuum-type container enclosing a cathode structure for intercepting and absorbing substantially all the incident radiation directed thereto, said cathode comprising a multifold support surface coated with a first layer of a fluorescent material sensitive to said incident radiation and of a thickness such that substantially all the radiation generated within said layer in response to said incident radiation is emitted therefrom, a second layer of a transparent material, and a third layer of electron emissive material sensitive to the radiation from said first layer, said cathode positioned such that the path of the radiation flux entering said envelope passes through one fold after another of said multifold surface, and a common electrode for collecting substantially all of the electrons emitted from said electron emissive layer.

10. A radiation detector comprising a vacuum-type container enclosing an anode, a cathode, and an electron multiplier, said cathode and said electron multiplier being coated with a first layer comprising a fluorescent substance, a second layer comprising a transparent conductor substance and a third layer comprising cesiated antimony.

11. A radiation detector comprising a vacuum-type container enclosing an anode, a cathode, and an electron multiplier, said cathode and said electron multiplier being coated with a first layer of zinc sulphide, a second layer comprising a transparent conductor substance and a third layer comprising cesiated antimony.

References Cited in the file of this patent

UNITED STATES PATENTS

| | | |
|---|---|---|
| 1,870,596 | Woodward | Aug. 9, 1932 |
| 2,115,155 | Banks | Apr. 26, 1938 |
| 2,125,750 | Ramberg | Aug. 2, 1938 |
| 2,134,718 | Knoop | Nov. 1, 1938 |
| 2,177,360 | Busse | Oct. 24, 1939 |
| 2,555,423 | Sheldon | June 5, 1951 |
| 2,594,740 | De Forest et al. | Apr. 29, 1952 |
| 2,606,299 | Coltman et al. | Aug. 5, 1952 |
| 2,612,610 | Marshall et al. | Sept. 30, 1952 |
| 2,700,116 | Sheldon | Jan. 18, 1955 |
| 2,724,060 | Scherbatskoy | Nov. 15, 1955 |
| 2,739,244 | Sheldon | Mar. 20, 1956 |